(12) United States Patent
Born

(10) Patent No.: US 7,867,459 B2
(45) Date of Patent: Jan. 11, 2011

(54) COMPACT, TIERED SULFUR RECOVERY UNIT

(76) Inventor: Sidney Leroy Born, 50 Lansing St., #704, San Francisco, CA (US) 94105

( * ) Notice: Subject to any disclaimer, the term of this patent is extended or adjusted under 35 U.S.C. 154(b) by 428 days.

(21) Appl. No.: 12/173,605

(22) Filed: Jul. 15, 2008

(65) Prior Publication Data

US 2010/0012051 A1   Jan. 21, 2010

(51) Int. Cl.
- *B01J 8/04* (2006.01)
- *B01J 10/00* (2006.01)
- *B01J 19/00* (2006.01)
- *B01J 35/02* (2006.01)
- *B01J 8/02* (2006.01)
- *B01D 15/00* (2006.01)
- *C01B 17/02* (2006.01)

(52) U.S. Cl. .................. 422/630; 422/600; 422/631; 422/636; 422/650; 423/574.1; 423/576

(58) Field of Classification Search ......... 422/188–190, 422/192, 196, 198, 211, 262; 122/7 R; 423/574.1, 423/576
See application file for complete search history.

(56) References Cited

U.S. PATENT DOCUMENTS

| | | | |
|---|---|---|---|
| 2,497,095 A | 2/1950 | Nevins et al. | |
| 2,534,792 A | 12/1950 | Nevins et al. | |
| 2,889,207 A | 6/1959 | Eliot | |
| 2,939,769 A | 6/1960 | Webb | |
| 3,057,698 A | 10/1962 | Grekel et al. | |
| 3,607,132 A | 9/1971 | Sudduth | |
| 4,001,384 A | 1/1977 | Iwakura et al. | |
| 4,029,753 A | 6/1977 | Beavon | |
| 4,035,158 A | 7/1977 | Scott et al. | |
| 4,085,199 A | 4/1978 | Singleton | |
| 4,293,525 A | 10/1981 | Reitzenstein | |
| 4,391,791 A | 7/1983 | Palm et al. | |
| 4,596,699 A | 6/1986 | Desgrandchamps et al. | |
| 4,632,043 A | 12/1986 | Pendergraft | |
| 4,632,818 A | 12/1986 | Chen et al. | |

(Continued)

FOREIGN PATENT DOCUMENTS

GB    890793    3/1962

*Primary Examiner*—Walter D Griffin
*Assistant Examiner*—Natasha Young
(74) *Attorney, Agent, or Firm*—Head, Johnson & Kachigian, P.C.

(57) ABSTRACT

A compact, tiered sulfur recovery unit having a burner, a combustion chamber, a reaction chamber, a waste heat boiler and a steam drum. The waste heat boiler is mounted above the reaction chamber, and the steam drum is mounted above the waste heat boiler, resulting in a three-tiered, compact design, requiring only a single platform for space. The reaction chamber comprises a horizontal body and an upright plenum. The reaction chamber includes an inlet for receipt of acid gas ($H_2S$). One end of the horizontal body of the reaction chamber is fluidly attached to the combustion chamber, while the other end of the horizontal body of the reaction chamber is fluidly attached to a lower end of the upright plenum of the reaction chamber. An upper end of the upright plenum of the reaction chamber is fluidly attached to the waste heat boiler. The waste heat boiler includes an outlet for the release of $SO_2$ for downstream sulfur blowdown to produce additional elemental sulfur. The waste heat boiler is fluidly attached to the steam drum.

20 Claims, 3 Drawing Sheets

U.S. PATENT DOCUMENTS

| | | |
|---|---|---|
| 4,965,062 A | 10/1990 | Van Dijk et al. |
| 5,439,664 A | 8/1995 | Heisel et al. |
| 6,042,803 A | 3/2000 | Watson |
| 6,455,012 B1 | 9/2002 | Walker |
| 7,226,572 B1 | 6/2007 | Keller et al. |
| 2008/0050306 A1 * | 2/2008 | Keller et al. ............. 423/574.1 |

* cited by examiner

COMPACT, TIERED SULFUR RECOVERY UNIT

FIELD OF THE INVENTION

This invention relates generally to a compact, tiered sulfur recovery unit for the recovery of elemental sulfur from hydrogen sulfide, and more particularly to a compact, tiered sulfur recovery unit utilizing a compact, efficient design configuration that combines a burner, a combustion chamber, a reaction chamber, a waste heat boiler and a steam drum into a three-tiered, compact design, requiring only a single platform for space.

DESCRIPTION OF THE RELATED ART

Sulfur recovery plants, also called Claus plants, are well known and utilize the most significant gas desulfurizing process for recovering elemental sulfur from gaseous hydrogen sulfide ($H_2S$). Hydrogen sulfide is a colorless, flammable, corrosive, highly toxic gas having a pungent odor. Sulfur recovery plants recover elemental sulfur from hydrogen sulfide gas found in natural gas and from the byproduct gases containing hydrogen sulfide resulting from petroleum refining processes and other industrial processes. Sulfur recovery plants can be divided into two primary process stages: a thermal or combustion stage and a catalytic stage. In the thermal stage, which is carried out in a combustor and reactor, the hydrogen sulfide gas is partially oxidized with a stoichiometric amount of air or a mixture of oxygen and air in a burner. The oxidation reaction (Equation 1 infra) is highly exothermic and not limited by equilibrium. While in the reactor, a portion of the uncombusted hydrogen sulfide reacts with some of the sulfur dioxide ($SO_2$) product to form elemental sulfur ($S_n$) and water vapor (Equation 2 infra) which is sometimes referred to as the "Claus reaction," is endothermic, and the extent of conversion of the hydrogen sulfide and sulfur dioxide to elemental sulfur is limited only by the chemical equilibrium of the reaction.

The following chemical reactions are utilized by sulfur recovery plants to convert the hydrogen sulfide gas to elemental sulfur:

$$H_2S + 1\tfrac{1}{2} O_2 <==> SO_2 + H_2O \qquad (1)$$

$$2\, H_2S + SO_2 <==> 3/_n S_n + 2\, H_2O \qquad (2)$$

The overall reaction for the process is:

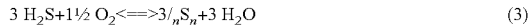

$$3\, H_2S + 1\tfrac{1}{2} O_2 <==> 3/_n S_n + 3\, H_2O \qquad (3)$$

In the thermal stage, a total of about 60 to 70% of the hydrogen sulfide gas originally fed into the reaction chamber is converted to elemental sulfur. The hot combustion gases from the combustor enter a waste heat boiler and are partially cooled by generating steam. The hot combustion gases are sufficiently cooled to condense the elemental sulfur formed in the combustor. The heat given off by the combustion gas and the condensation heat evolved are utilized to generate steam. The condensed elemental sulfur is removed from the waste heat boiler, while the remaining uncombusted hydrogen sulfide and sulfur dioxide enter the catalytic stage for additional sulfur removal, which is typically carried out in a series of downstream catalytic reactors.

In the catalytic stage, the remaining hydrogen sulfide is reacted with the sulfur dioxide at lower temperatures over a bed of sulfur conversion catalysts, typically alumina or titanium dioxide. Prior to being passed over the catalysts, the gases are reheated in order to avoid sulfur condensing in the downstream catalyst bed. Thereafter, the remaining hydrogen sulfide is reacted with the sulfur dioxide at lower temperatures over the catalyst to make more sulfur. Additional catalytic reactors are necessary to allow the reaction to go to completion, with elemental sulfur being removed between catalytic reactors. Various factors, such as concentration, flow rate and reaction temperature, influence the reaction. Anywhere from one to four additional heating, reaction and condensing stages are usually employed industrially to react most of the remaining hydrogen sulfide and sulfur dioxide. The sulfur recovery plant tail gas is typically routed to either a tail gas unit for further desulphurization or to an incineration unit, which can allow for overall sulfur recovery of over 97%.

Current sulfur recovery units ("SRU") utilized in the thermal stage in refineries are typically laid out and designed in a linear, end to end fashion. In addition, the burner, the combustor, the reaction chamber and the waste heat boiler of known SRU's are typically located in grade level separate individual platforms. Another disadvantage is that the equipment is typically laid out and designed in a linear, end to end fashion, more expensive to build and causes the SRU to take up a large amount of plot space. In order to be in compliance with ever-increasing environmental regulations, typical SRU's constitute a great deal of equipment and occupy a large space.

It is therefore desirable to provide a compact, tiered SRU that provides space-savings on the order of 50-65% over traditional SRU's having a serial layout.

It is further desirable to provide a compact, tiered SRU that allows an existing refinery who is revamping and/or upgrading its capacity to implement without having to relocate roads, pipe racks, and other equipment.

It is further desirable to provide a compact, tiered SRU that provides benefits to new plant constructions in savings to plot area, piping, pipe racks, etc.

SUMMARY OF THE INVENTION

In general, in a first aspect, the invention relates to a compact, tiered sulfur recovery unit includes a burner fluidly connected to a combustion chamber and a reaction chamber having a horizontal body and a substantially upright plenum. The horizontal body of the reaction chamber has opposing ends, while the upright plenum has a lower end and an upper end. One end of the horizontal body of the reaction chamber is fluidly connected to the combustion chamber, while the other end of the horizontal body of the reaction chamber is fluidly connected to the lower end of the upright plenum. The compact, tiered sulfur recovery unit also includes a waste heat boiler fluidly connected to the upper end of the upright plenum of the reaction chamber and a steam drum fluidly connected to the waste heat boiler. An inlet port is provided in the horizontal body of the reaction chamber for receipt of an acidic sulfuric gas, such as gaseous hydrogen sulfide. An outlet port is provided in the waste heat boiler to release hot combustion products for additional downstream sulfur blowdown. The waste heat boiler is mounted above the horizontal body of the reaction chamber and the steam drum is mounted above the waste heat boiler, resulting in the compact, tiered sulfur recovery unit.

The burner, the combustion chamber, the reaction chamber, the waste heat boiler and the steam drum of the compact, tiered sulfur recovery unit may be horizontally oriented, respectively. In addition, the burner, the combustion chamber and the horizontal body of the reaction chamber may form a first tier, the waste heat boiler may form a second tier, and the steam drum may form a third tier. The first tier, the second tier and the third tier can be aligned on parallel axes. Further, the burner, the combustion chamber and the horizontal body of the reaction chamber can be coaxially aligned. Moreover, the inlet port of the reaction chamber and the outlet port of the waste heat boiler may be positioned near the same ends of the compact, tiered sulfur recovery unit.

The horizontal body and the upright plenum of the reaction chamber of the compact, tiered sulfur recover unit may include internal thermal elements, such as ceramic tubes or refractory materials. Additionally, the reaction chamber may include a plurality of reaction zones.

The waste heat boiler may be mounted to a support platform above the horizontal body of the reaction chamber, and the orientation of the waste heat boiler and the upright plenum form a radiant heat wall between the reaction chamber and the waste heat boiler. The acidic sulfuric gases within the reaction chamber can be heated to approximately 1,000-1,300° C. using the burner fluidly connected to the combustion chamber. The heated acidic sulfuric gases form the hot combustion products that flow out of the upper end of the upright plenum of the reaction chamber into the waste heat boiler. The hot combustion products may then be partially cooled in the waste heat boiler to approximately 300-500° C. by steam created in the steam drum.

In general, in a second aspect, the invention relates to a compact, tiered sulfur recovery unit including a substantially horizontal combustion chamber having a burner at a first terminal end and a substantially horizontal reaction chamber having a main body and a substantially upright plenum. The main body of the reaction chamber has opposing ends, while the upright plenum has a lower end and an upper end. One end of the main body of the reaction chamber is fluidly connected to a second terminal end of the combustion chamber, and the other end of the main body of the reaction chamber is fluidly connected to the lower end of the upright plenum. The compact, tiered sulfur recovery unit also includes a substantially horizontal waste heat boiler fluidly connected to the upper end of the upright plenum of the reaction chamber and a substantially horizontal steam drum fluidly connected to the waste heat boiler. An inlet port may be provided in the main body of the reaction chamber for receipt of gaseous hydrogen sulfide. An outlet port may be provided in the waste heat boiler to release hot combustion products for additional downstream sulfur blowdown.

The burner, the combustion chamber, the main body of the reaction chamber, and the lower end of the upright plenum form a first tier of a compact, tiered sulfur recovery unit. The waste heat boiler and the upper end of the upright plenum form a second tier of the compact, tiered sulfur recovery unit, while the steam drum forms a third tier of the compact, tiered sulfur recovery unit. The first tier, the second tier and the third tier of the compact, tiered sulfur recovery unit are aligned on parallel axes.

The inlet port of the reaction chamber and the outlet port of the waste heat boiler may be positioned near the same ends of the compact, tiered sulfur recovery unit. The main body and the upright plenum of the reaction chamber may include internal thermal elements, such as ceramic tubes or refractory materials. Additionally, the reaction chamber can include a plurality of reaction zones within the reaction chamber. The waste heat boiler of the compact, tiered sulfur recovery unit may be mounted to a support platform above the main body of the reaction chamber, and the orientation of the waste heat boiler and the upright plenum form a radiant heat wall between the reaction chamber and the waste heat boiler.

Other advantages and features will be apparent from the following description, and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
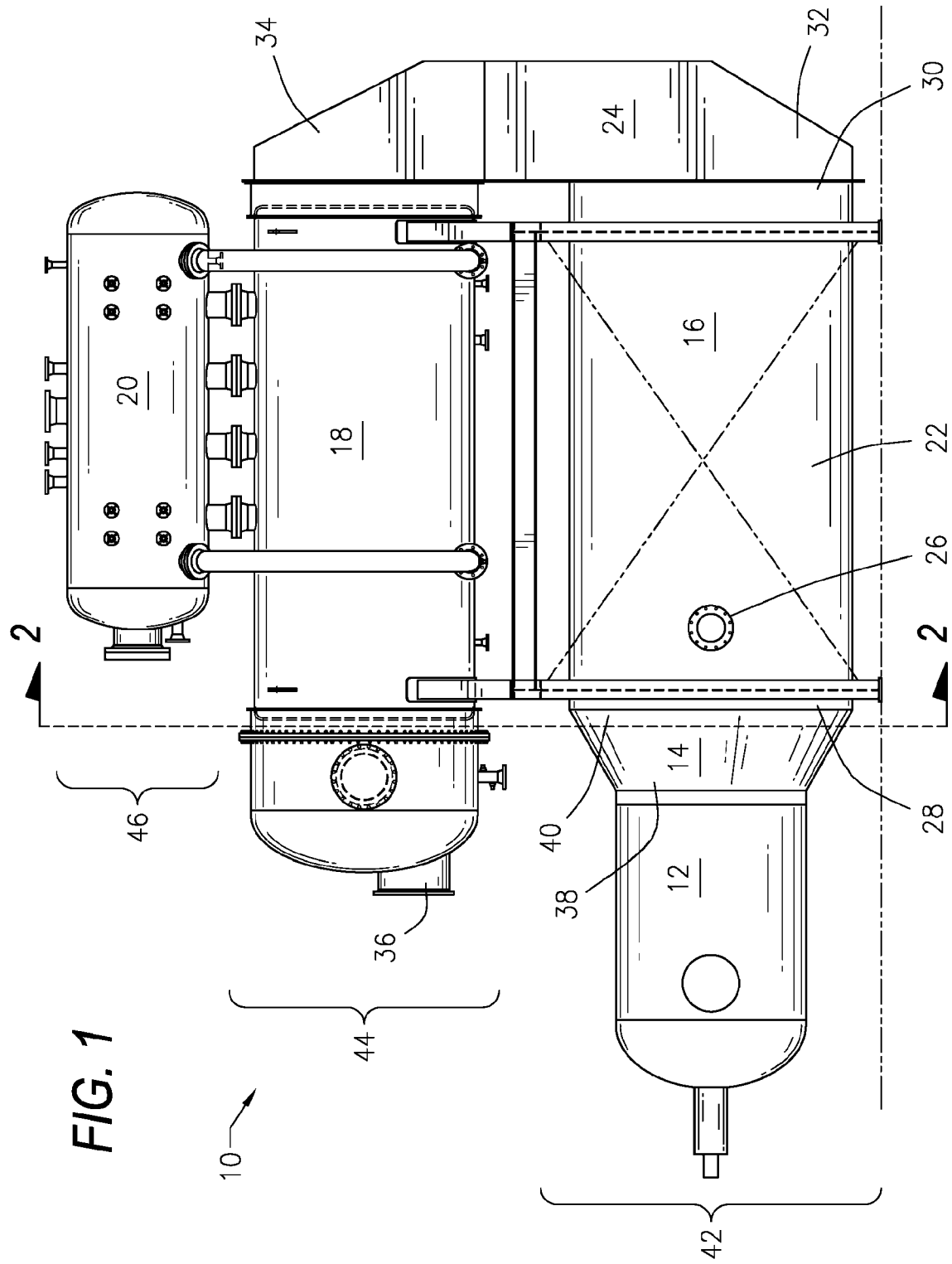
FIG. 1 is a side elevation view of an example of a compact, tiered sulfur recovery unit in accordance with an illustrative embodiment of the compact, tiered sulfur recovery unit disclosed herein.

Referring to the figures of the drawings, wherein like numerals of reference designate like elements throughout the several views, and initially to FIG. 1, a compact, tiered sulfur recovery unit 10 comprises a burner 12, a combustion chamber 14, a reaction chamber 16, a waste heat boiler 18 and a steam drum 20. The waste heat boiler 18 is mounted above the reaction chamber 16, and the steam drum 20 is mounted above the waste heat boiler 18, resulting in a three-tiered, compact design, requiring only a single platform for space. The reaction chamber 16 comprises a horizontal body 22 and an upright plenum 24. The reaction chamber 16 includes an inlet 26 for receipt of an acid gas, such as gaseous hydrogen sulfide ($H_2S$). One end 28 of the horizontal body 22 of the reaction chamber 16 is attached in fluid connection to the combustion chamber 14, while the other end 30 of the horizontal body 22 of the reaction chamber 16 is fluidly attached to a lower end 32 of the upright plenum 24 of the reaction chamber 16. The burner 12, the combustion chamber 14 and the horizontal body 22 of the reaction chamber 16 may be coaxially aligned. The horizontal body 22 and the upright plenum 24 of the reaction chamber 16 contain internal thermal elements 66, such as ceramic tubing or other refractory materials, to aid in kinetic reactions during the sulfur recovery process. The compact, tiered sulfur recovery unit 10 does not require catalysts or a catalyst bed within the reaction chamber 16, but rather utilizes the internal thermal elements 66, such as ceramic tubes or other thermal or refractory elements to sufficiently heat the inputted acidic sulfuric gases for the thermal reaction to produce elemental sulfur. An upper end 34 of the upright plenum 24 of the reaction chamber 16 is attached in fluid connection to the waste heat boiler 18. The waste heat boiler 18 includes an outlet 36 for the release of sulfur dioxide ($SO_2$) for downstream sulfur blowdown to produce additional elemental sulfur via catalytic reactions. The waste heat boiler 18 is fluidly attached to the steam drum 20. Both the waste heat boiler 18 and steam drum 20 are substantially horizontal, resulting in the reaction chamber 16, the waste heat boiler 18 and the steam drum 20 being aligned along parallel axes. Moreover, the inlet port 26 of the reaction chamber 16 and the outlet port 36 of the waste heat boiler 18 may be positioned near the same ends of the compact, tiered sulfur recovery unit 10.

In operation, acidic sulfuric gases, such as $H_2S$, are fed into the reaction chamber 16 via the inlet port 26. In the reaction chamber 16, the sulfuric acidic gases are heated to approximately 1,000-1,300° C. using the burner 12 attached to the combustion chamber 14. In the reaction chamber 16, the acid gas is thermally converted to sulfur dioxide ($SO_2$). This thermal reaction is aided by the internal thermal elements 66 within the horizontal body 22 and the upright plenum 24 of the reaction chamber 16. The thermal conversion of the acid gas begins in the horizontal body 22 of the reaction chamber 16 and continues through the upright plenum 24 of the reaction chamber 16. The upright plenum 24 allows for the compact and tiered design of the compact, tiered sulfur recovery unit 10 and is necessary for complete thermal cracking reaction. The hot combustion products from the upright plenum 24 of the reaction chamber 16 enter the waste heat boiler 18 and are partially cooled by steam generated by the steam drum 20. The hot combustion products are cooled in the waste heat boiler 18 to approximately 300-500° C. The resulting elemental sulfur may be removed from the waste heat boiler 18, while the remaining cooled combustion products leave the waste heat boiler 18 through the outlet 36 and are feed downstream for further sulfur blowdown using catalytic reactions to produce additional elemental sulfur.

Figure 2:
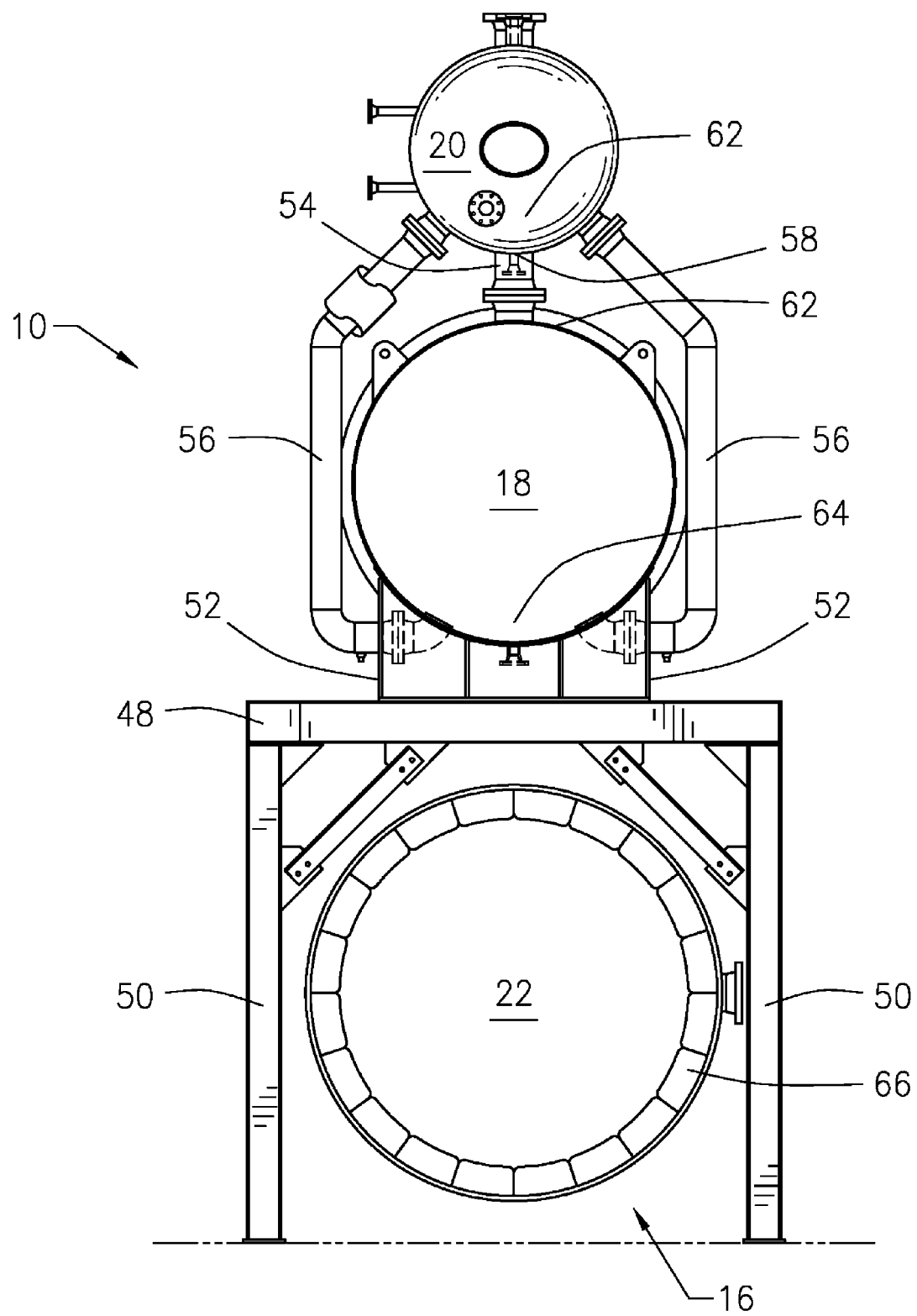
FIG. 2 is a cross-section view along line 2-2 of the compact, tiered sulfur recovery unit shown in FIG. 1.
Figure 3:
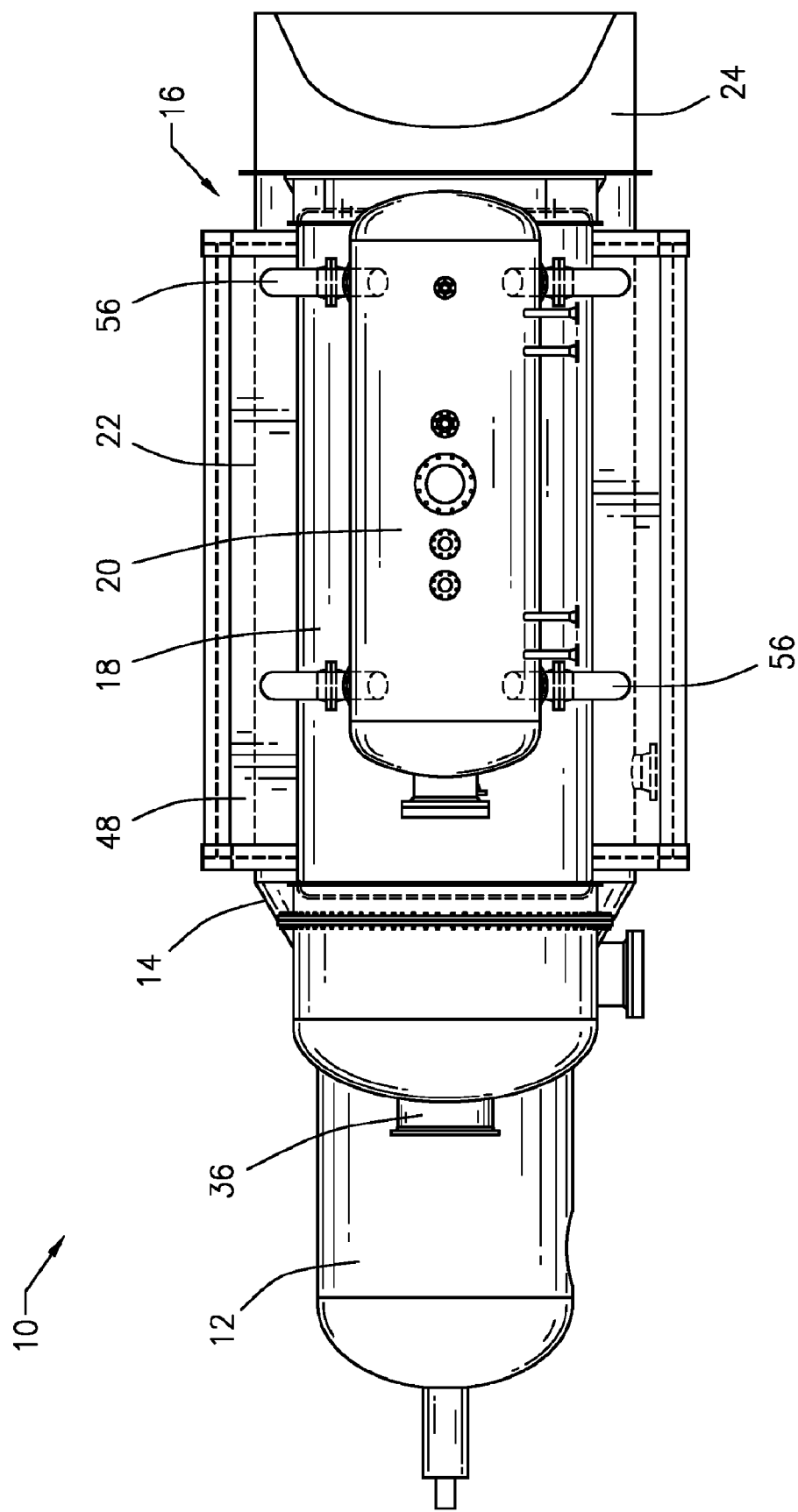
FIG. 3 is a top elevation view of an example of a compact, tiered sulfur recovery unit in accordance with an illustrative embodiment of the compact, tiered sulfur recovery unit disclosed herein.

Referring now to FIGS. 2 and 3, the compact, tiered sulfur recovery unit 10 has a substantially horizontal combustion chamber 14 with a burner 12 fluidly connected at a first terminal end 38. A second terminal end 40 of the combustion chamber 14 is fluidly connected to a first opposing end 28 of a main body 22 of a substantially horizontal reaction chamber 16. The burner 12, the combustion chamber 14 and the main body 22 of the reaction chamber 16 may be coaxially aligned. In addition, the burner 12, the combustion chamber 14 and the main body 22 of the reaction chamber 16 form a first tier 42 of the compact, tiered sulfur recovery unit 10. The main body 22 of the reaction chamber 16 includes an inlet port 26 for receipt of acidic sulfuric gas for thermal processing to produce elemental sulfur. The combustion chamber 14 and the reaction chamber 16 may heat the inputted acidic sulfuric gas to approximately 1,000-1,300° C. using the burner 12 fluidly connected to the combustion chamber 14.

A lower end 32 of a substantially upright plenum 24 is fluidly connected to a second opposing end 30 of the main body 22 of the reaction chamber 16. The main body 22 and the substantially upright plenum 24 form the reaction chamber 16, both of which may include internal thermal elements 66, such as ceramic tubes or other refractory materials. Further, the reaction chamber 16 may be separated into separate zones (not shown) to allow additional thermal conversion of inputted acidic sulfuric gas, such as hydrogen sulfide. The thermal conversion of the acidic sulfuric gas begins in the main body 22 of the reaction chamber 16 and continues through the upright plenum 24 of the reaction chamber 16. The substantially upright plenum 24 of the reaction chamber 16 allows for the compact footprint of the compact, tiered sulfur recovery unit 10.

An upper end 34 of the substantially upright plenum 24 of the reaction chamber 16 is fluidly connected to a substantially horizontal waste heat boiler 18, which is mounted above the main body 22 of the reaction chamber 16. The waste heat boiler 18 may be mounted on a support platform 48 above the main body 22 of the reaction chamber 16. The orientation of the waste heat boiler 18 and the upright plenum 24 form a radiant heat wall between the reaction chamber 16 and the waste heat boiler 18, which prevents the waste heat boiler 18 from exposure to the radiant heat zone produced by the combustion chamber 14 and the reaction chamber 16. The support platform 48 may be supported by a plurality of support legs 50. Additionally, the waste heat boiler 18 may be mounted to the support platform 48 using a pair of support brackets 52. The waste heat boiler 18 forms a second tier 44 of the compact, tiered sulfur recovery unit 10.

A substantially horizontal steam drum 20 is fluidly connected to the waste heat boiler 18 and is mounted above the waste heat boiler 18. The steam drum 20 may be fluidly connected to the waste heat boiler 18 via a series of upper pipes 54 and a series of lower pipes 56. The upper pipes 54 may be fluidly connected to a bottom 58 of the steam drum 20 and a top 60 of the waste heat boiler 18. The lower pipes 56 may be fluidly connected to a lower portion 62 of the steam drum 20 and a lower portion 64 of the waste heat boiler 18. The steam drum 20 forms a third tier 46 of the compact, tiered sulfur recovery unit 10. Steam produced in the steam drum 20 partially cools the hot combustion products within the waste heat boiler 18 to approximately 300-500° C. The cooled combustion products exit the waste heat boiler 18 through the outlet 36 positioned at an end opposite the fluid connection the upper end 34 of the substantially upright plenum 24 of the reaction chamber 16. The cooled combustion products are feed downstream for further sulfur blowdown in at least one catalytic reaction to produce additional elemental sulfur.

The first tier 42 having the burner 12, the combustion chamber 14, the main body 22 of the reaction chamber 16 and the lower end 32 of a substantially upright plenum 24, and the second tier 44 having the upper end 34 of the substantially upright plenum 24 and the waste heat boiler 18, and the third tier 46 having the steam drum 20 are aligned on parallel axes to form the compact, tiered sulfur recovery unit 10. Further, the inlet port 26 of the reaction chamber 16 and the outlet port 36 of the waste heat boiler 18 may be positioned near the same ends of the compact, tiered sulfur recovery unit 10.

The compact, tiered sulfur recovery unit 10, which is the heart of a sulfur plant, has numerous advantages in both engineering and economic advantages. The compact, tiered sulfur recovery unit 10 provides an efficient sulfur recovery unit (SRU) design configuration by combining four separate components, the SRU combustor 12 and 14, the SRU reaction chamber 16, the SRU waste heat boiler 18 and the SRU steam drum 20, into a single three-tiered stacked design configuration utilizing a common structure and foundation, thus allowing all the structural, thermal, piping and civil loads to be combined. The compact, tiered sulfur recovery unit 10 saves on multiple structural and civil foundations, resulting in a great deal of space savings, such as from 50% to 65% over the traditional serial layout of SRU's. The compact, tiered sulfur recovery unit 10 saves engineering time and cost, review, precious plant space, which is particularly acute in retrofit applications with increased capacity, in which space is limited.

The compact, tiered sulfur recovery unit 10 also provides savings in both civil and structural work, along with supply, piping layout and runs, piping supports, and in efficiency of compact equipment flow. Additionally, the compact, tiered sulfur recovery unit 10 increases operation efficiency, as well as maintenance efficiency. The compact, tiered sulfur recovery unit 10 allows for all work to be concentrated in one centrally located space by allowing all field work and operating maintenance to be preformed in one location, with ease of access to each tier 42, 44 and 46 of the compact, tiered sulfur recovery unit 10.

Each of the components 12, 14, 16, 18 and 20 in each of the tiers 42, 44 and 46 are horizontally oriented allowing fine tuning of both the internal and external critical windows of operation. The critical processes and equipment windows of operation are critical to the process design, equipment design and safety of the compact, tiered sulfur recovery unit 10, in addition to avoiding failures or improper operation. Furthermore, the piping 54 and 56 fluidly connecting the waste heat boiler 18 and the steam drum 20 enhance the further sulfur blowdown process.

The compact, tiered sulfur recovery unit 10 further provides increased design flexibility in the SRU reaction chamber 16, allowing for increased capacity during recovery of elemental sulfur in the thermal process, as well as fine tunes the complex design parameters required in SRU's, such as by allowing for a dual zone reaction chamber 16 or single zone reaction chamber 16 with complex chemistry without having to change the footprint of the compact, tiered sulfur recovery unit 10.

The external structure of the components of the compact, tiered sulfur recovery unit 10 have a window of thermal optimum operation, which is enhanced by the compact, tiered vertical structure. The compact, tiered configuration of the compact, tiered sulfur recovery unit 10 allows tighter control by design of the external thermal environment at the primary and secondary levels, which is critical for the lifetime of the components, maintenance, and safety.

The problems associated with large thermal expansion of known SRU's are solved by the compact, tiered sulfur recovery unit 10. Known SRU's utilize serially aligned components, which exaggerates the thermal expansion problems, with an additive serial effect. The foundation loads are accounted for in one unit with the compact, tiered sulfur recovery unit 10 in both the cold static condition and during operation. The compact, tiered sulfur recovery unit 10 allows for horizontal thermal growth on the primary level, countered by opposite end thermal growth in the secondary level, which is divided into the vertical plane. This counter effect evens out the loading and maintains load stability of the whole compact, tiered sulfur recovery unit 10. The vertical growth, with the configuration of the compact, tiered sulfur recovery unit 10 is allowed without plant constraints, and further, both cold and operational conditions are allowed and accounted for in the compact, tiered sulfur recovery unit 10. Moreover, there are no overhead constraints associated with the compact, tiered sulfur recovery 10, and gives improved flexibility of designs, which is particularly important in large capacity SRU's.

Additionally, the internal process operation is enhanced and improved with the compact, tiered sulfur recovery unit 10. In one of the most important and critical criteria, the orientation of the waste heat boiler 18 and the upright plenum 24 form a radiant heat wall between the reaction chamber 16 and the waste heat boiler 18, which protects the waste heat boiler 18 hot face tube sheet from exposure to the radiant heat zone produced by the combustion 14 and reaction chamber 16. This improves and enhances the waste heat boiler 18 operation, in addition to preventing malfunction from disaster, failure and/or leakage.

Moreover, the compact, tiered sulfur recovery unit 10 provides numerous economic advantages in savings in plant space. The compact, tiered sulfur recovery unit 10 allows for efficient and compact piping and instrumentation configuration yielding easy access for operation and maintenance, centralized fieldwork, and decreased plant engineering, review and civil work. The compact, tiered sulfur recovery unit 10 also provides longer life, fewer problems and less maintenance as definite economic advantageous factors. Furthermore, the compact tiered sulfur recovery unit 10 provides advantages in plant esthetics. The compact, tiered sulfur recovery unit 10 is esthetically appealing, sleek, and compact and has an appealing form factor, which improves overall plant esthetics.

Whereas, the devices and methods have been described in relation to the drawings and claims, it should be understood that other and further modifications, apart from those shown or suggested herein, may be made within the spirit and scope of this invention.

What is claimed is:

1. A compact, tiered sulfur recovery unit, comprising:
    a burner fluidly connected to a combustion chamber;
    a reaction chamber having a horizontal body and a substantially upright plenum; the horizontal body of the reaction chamber having opposing ends; the upright plenum having a lower end and an upper end; wherein one end of the horizontal body of the reaction chamber is fluidly connected to the combustion chamber; wherein the other end of the horizontal body of the reaction chamber is fluidly connected to the lower end of the upright plenum;
    a waste heat boiler fluidly connected to the upper end of the upright plenum of the reaction chamber;
    a steam drum fluidly connected to the waste heat boiler;
    an inlet port in the horizontal body of the reaction chamber for receipt of an acidic sulfuric gas;
    an outlet port in the waste heat boiler to release hot combustion products for additional downstream sulfur blowdown; and
    wherein the waste heat boiler is mounted above the horizontal body of the reaction chamber and the steam drum is mounted above the waste heat boiler, resulting in a compact, tiered sulfur recovery unit.

2. The compact, tiered sulfur recovery unit of claim 1 wherein the burner, the combustion chamber, the reaction chamber, the waste heat boiler and the steam drum are horizontally oriented, respectively.

3. The compact, tiered sulfur recovery unit of claim 2 wherein the burner, the combustion chamber, the horizontal body of the reaction chamber, and the lower end of the upright plenum form a first tier, wherein the waste heat boiler and the upper end of the upright plenum form a second tier, wherein the steam drum forms a third tier, and wherein the first tier, the second tier and the third tier are aligned on parallel axes.

4. The compact, tiered sulfur recovery unit of claim 1 wherein the burner, the combustion chamber and the horizontal body of the reaction chamber are coaxially aligned.

5. The compact, tiered sulfur recovery unit of claim 1 wherein the inlet port of the reaction chamber and the outlet port of the waste heat boiler are positioned near the same ends of the compact, tiered sulfur recovery unit.

6. The compact, tiered sulfur recovery unit of claim 1 wherein the acidic sulfuric gas is gaseous hydrogen sulfide.

7. The compact, tiered sulfur recovery unit of claim 1 wherein the horizontal body and the upright plenum of the reaction chamber include internal thermal elements.

8. The compact, tiered sulfur recovery unit of claim 7 wherein the internal thermal elements are ceramic tubes or refractory materials.

9. The compact, tiered sulfur recovery unit of claim 1 wherein the reaction chamber includes a plurality of reaction zones within the reaction chamber.

10. The compact, tiered sulfur recovery unit of claim 1 wherein the waste heat boiler is mounted to a support platform above the horizontal body of the reaction chamber.

11. The compact, tiered sulfur recovery unit of claim 1 wherein the orientation of the waste heat boiler and the upright plenum form a radiant heat wall between the reaction chamber and the waste heat boiler.

12. The compact, tiered sulfur recovery unit of claim 1 wherein the acidic sulfuric gases within the reaction chamber are heated to approximately 1,000-1,300° C. using the burner fluidly connected to the combustion chamber.

13. The compact, tiered sulfur recovery unit of claim 12 wherein the heated acidic sulfuric gases form the hot combustion products that flow out of the upper end of the upright plenum of the reaction chamber into the waste heat boiler.

14. The compact, tiered sulfur recovery unit of claim 13 wherein the hot combustion products are partially cooled in the waste heat boiler to approximately 300-500° C. by steam created in the steam drum.

15. A compact, tiered sulfur recovery unit, comprising:
   a substantially horizontal combustion chamber having a burner at a first terminal end;
   a substantially horizontal reaction chamber having a main body and a substantially upright plenum; the main body of the reaction chamber having opposing ends; the upright plenum having a lower end and an upper end; wherein one end of the main body of the reaction chamber is fluidly connected to a second terminal end of the combustion chamber; wherein the other end of the main body of the reaction chamber is fluidly connected to the lower end of the upright plenum;
   a substantially horizontal waste heat boiler fluidly connected to the upper end of the upright plenum of the reaction chamber;
   a substantially horizontal steam drum fluidly connected to the waste heat boiler;
   an inlet port in the main body of the reaction chamber for receipt of gaseous hydrogen sulfide;
   an outlet port in the waste heat boiler to release hot combustion products for additional downstream sulfur blowdown;
   wherein the burner, the combustion chamber and the main body of the reaction chamber are coaxially aligned;
   wherein the burner, the combustion chamber, the main body of the reaction chamber, and the lower end of the upright plenum form a first tier of a compact, tiered sulfur recovery unit;
   wherein the waste heat boiler and the upper end of the upright plenum form a second tier of the compact, tiered sulfur recovery unit;
   wherein the steam drum forms a third tier of the compact, tiered sulfur recovery unit; and
   wherein the first tier, the second tier and the third tier of the compact, tiered sulfur recovery unit are aligned on parallel axes.

16. The compact, tiered sulfur recovery unit of claim 15 wherein the inlet port of the reaction chamber and the outlet port of the waste heat boiler are positioned near the same ends of the compact, tiered sulfur recovery unit.

17. The compact, tiered sulfur recovery unit of claim 15 wherein the main body and the upright plenum of the reaction chamber include internal thermal elements.

18. The compact, tiered sulfur recovery unit of claim 17 wherein the thermal elements are ceramic tubes or refractory materials.

19. The compact, tiered sulfur recovery unit of claim 15 wherein the reaction chamber includes a plurality of reaction zones within the reaction chamber.

20. The compact, tiered sulfur recovery unit of claim 15 wherein the waste heat boiler is mounted to a support platform above the main body of the reaction chamber, and wherein the orientation of the waste heat boiler and the upright plenum form a radiant heat wall between the reaction chamber and the waste heat boiler.

* * * * *